United States Patent [19]
Goldman et al.

[11] Patent Number: 6,036,098
[45] Date of Patent: *Mar. 14, 2000

[54] MINIATURE SCAN ELEMENT OPERABLY CONNECTED TO A PERSONAL COMPUTER INTERFACE CARD

[75] Inventors: Ron Goldman, Westbury, N.Y.; Edward R. Alexander, Orlando, Fla.; Yajun Li, Oakdale, N.Y.; Simon Bard, Setauket, N.Y.; Askold Strat, Patchogue, N.Y.; Joseph Katz; Boris Metlitsky, both of Stony Brook, N.Y.

[73] Assignee: Symbol Technologies, Inc., Holtsville, N.Y.

[ * ] Notice: This patent is subject to a terminal disclaimer.

[21] Appl. No.: 09/006,633

[22] Filed: Jan. 13, 1998

Related U.S. Application Data

[63] Continuation-in-part of application No. 08/269,424, Jun. 30, 1994, Pat. No. 5,468,952, which is a continuation-in-part of application No. 08/228,172, Apr. 15, 1994, Pat. No. 5,543,610, which is a continuation of application No. 07/884,734, May 15, 1992, abandoned.

[51] Int. Cl.$^7$ .................................................. G06K 7/00
[52] U.S. Cl. ............................................ 235/486; 235/487
[58] Field of Search ................................. 235/492, 486, 235/441, 487; 395/309, 893

[56] References Cited

U.S. PATENT DOCUMENTS

| | | | |
|---|---|---|---|
| 4,264,119 | 4/1981 | Minoura et al. | 350/6.6 |
| 4,360,798 | 11/1982 | Swartz et al. | 340/146.3 |
| 4,369,361 | 1/1983 | Swartz et al. | 235/470 |
| 4,387,297 | 6/1983 | Swartz et al. | 235/462 |
| 4,685,775 | 8/1987 | Goodman et al. | 350/486 |
| 4,714,830 | 12/1987 | Usui | 250/234 |
| 4,732,440 | 3/1988 | Gadhok | 350/6.6 |
| 4,871,904 | 10/1989 | Metlitsky et al. | 235/467 |
| 4,902,083 | 2/1990 | Wells | 350/6.6 |
| 4,919,500 | 4/1990 | Paulsen | 350/6.6 |
| 5,094,396 | 3/1992 | Burke | 242/107.1 |
| 5,168,149 | 12/1992 | Dvorkis et al. | 235/472 |
| 5,170,277 | 12/1992 | Bard et al. | 359/210 |
| 5,185,676 | 2/1993 | Nishiberi | 359/202 |
| 5,191,197 | 3/1993 | Metlitsky et al. | 235/472 |
| 5,280,165 | 1/1994 | Dvorkis et al. | 235/470 |
| 5,305,181 | 4/1994 | Schultz | 361/680 |
| 5,338,923 | 8/1994 | Gricu | 235/492 |
| 5,367,151 | 11/1994 | Dvorkis et al. | 235/472 |
| 5,412,198 | 5/1995 | Dvorkis | 235/472 |
| 5,468,952 | 11/1995 | Alexander et al. | 235/492 |
| 5,519,577 | 5/1996 | Dudas et al. | 361/737 |
| 5,543,610 | 8/1996 | Bard et al. | 235/462 |
| 5,664,231 | 9/1997 | Postman et al. | 395/893 |
| 5,671,374 | 9/1997 | Postman et al. | 395/309 |
| 5,708,262 | 1/1998 | Goldman et al. | 235/492 |
| 5,796,636 | 8/1998 | Andrews | 364/571.01 |
| 5,856,931 | 1/1999 | McCasland | 364/550 |
| 5,880,452 | 3/1999 | Plesko | 235/472 |

FOREIGN PATENT DOCUMENTS 0 471 291 A2   2/1992   European Pat. Off. ........ G02B 26/10

*Primary Examiner*—Thien M. Le
*Attorney, Agent, or Firm*—Gary Serbin

[57] ABSTRACT

A miniature high speed bar code scanning element is detachably mounted within an industry standard PCMCIA card for implementation in personal computing devices.

56 Claims, 7 Drawing Sheets

MINIATURE SCAN ELEMENT OPERABLY CONNECTED TO A PERSONAL COMPUTER INTERFACE CARD

CROSS-REFERENCE TO RELATED APPLICATIONS

This application is a continuation-in-part of application Ser. No. 08/269,424 filed on Jun. 30, 1994, now U.S. Pat. No 5,468,952 which is a continuation-in-part of application Ser. No. 08/228,172 filed on Apr. 15, 1994, now U.S. Pat. No. 5,543,610, which is hereby incorporated by reference, and which is a continuation of application Ser. No. 07/884,734 filed on May 15, 1992, now abandoned. This application is also related to application Ser. No. 08/173,249 filed on Dec. 23, 1993, which is hereby incorporated by reference.

BACKGROUND OF THE INVENTION

1. Field of the Invention

The present invention relates to a compact, light weight bar code scanning device that can be easily installed in a standard computer terminal connector. More particularly, it relates to a bar code scanning device housed in a standard input/output ("I/O") card that is capable of multi-directional scanning and that is connected to a peripheral I/O port. Still more particularly, this invention relates to a multi-directional bar code scanning device housed in a Personal Computer Memory Card International Association ("PCMCIA") standard memory card that is compatible with portable computers and other devices that conform to the PCMCIA standards.

2. Description of Related Art

Laser-based scanner systems are capable of reading indicia having parts of different light reflectivity, e.g., bar code symbols, particularly of the Universal Product Code (UPC) type. at a certain working or reading distance from a hand-held or stationary scanner. Typically, a light source such as a laser generates a light beam which is optically modified and focused to form a beam spot of a certain size at a working distance relative to a housing and is directed by optical components, including a reflecting mirror, along a light path through an exit port of the housing toward a bar code symbol located in the vicinity of the working distance for reflection from the symbol. A photodetector having a field of view extending across and slightly past the symbol detects light of variable intensity reflected off the symbol and generates electrical signals indicative of the detected light. These electrical signals are decoded into data descriptive of the symbol. A scanning component may be situated in the housing, and is operative to either sweep the beam spot in a scan pattern across the symbol, or to scan the field of view of the photodetector, or simultaneously do both. The scanning component is typically a drive motor operatively connected to the reflecting mirror. The scanning component can also be a charge-coupled device (CCD) array.

Many industries, particularly the grocery and food processing industry, designate their products with a unique bar code symbol consisting of a series of lines and spaces of varying widths. Various bar code readers and laser scanning systems have been developed to decode the symbol pattern to a multiple digit representation for check-out and inventory purposes.

Portable scanners that are known in the art consist of a portable computer connected by a cable to a bar code scanner. A signal processor or decoding apparatus can be located in the same housing with the scanner or it may be housed separately. In such cases, a cable connects the scanner to the processor or decoder and then a second cable connects the processor or decoder to the portable computer. In other cases, the signal processing or decoding is performed by the computer. All of these systems are inconvenient to use because of the cables and the separate housings for the scanner and the computer. Moreover, the advantages due to the portability of these units is diminished when the user needs both hands to carry the scanning system. This severely limits the user's ability to perform other functions and the cables are potential safety problems.

Many of the portable scanning systems currently in use require special interface hardware for connecting the scanner to the computer, including adaptors and cables. This adds to the initial cost of such systems and makes them more expensive to maintain.

Attempts have been made to integrate a bar code scanner and computer into a single housing. A computer would typically include a display, a keyboard, or a touch screen functioning as a display/keyboard. In an alternative embodiment the scanning system could be voice activated. Such scanning systems have the scanner mounted in a fixed position or adjustable to a limited number of fixed positions. These devices generally have drawbacks, including larger housings that limit portability and high initial cost. This has led to the need for a bar code scanner that is compact and light-weight and easily adapted to use with a portable computer and peripheral computer devices, such as modems.

The Personal Computer Memory Card International Association (PCMCIA), an organization comprised of hundreds of manufacturers of memory cards and related peripheral equipment, has established spatial standards for all circuit boards used in downsized computers. PCMCIA has developed a 68-pin memory card standard for three memory card types as follows:

a. Type I Memory Cards are the same width and length as a common credit card, about 54 mm ×85.6 mm, but are thicker than a credit card. The thickness of a Type I card is 3.3 mm (0.130").

b. Type II Memory Cards are used by those companies which are utilizing memory components that are too high to be housed within a Type I card. Type II Memory Cards are also the same overall length and width as credit cards, but have a raised body cross section in the substrate area which gives them an overall thickness of 5 mm (0.195"). The raised substrate areas of these cards are 48 mm in width.

c. Type III Memory Cards are the result of a recent movement sponsored by the Small Form Factor Committee to enable 1.8" Small Form Factor Disk Drives to be plugged into memory card connectors in small portable computer applications. Type III memory cards are the same length and width as Type I and Type II memory cards. However, Type III cards have a substrate area thickness of 10.5 mm. Also, Type III memory cards require a card guide opening width of 51 mm on the header connector to accommodate the slightly wider raised substrate area.

PCMCIA cards enhance the capabilities of a computer by providing standard interface software protocols and hardware interface. They have been used to interface memory, facsimile machines, modems and disk drives with the host computer. The standard connector size makes them compatible with most portable computers and they are designed for easy installation and removal. The present invention advances the art by providing a means for a miniature bar code scanner to be housed in a PCMCIA card and directly interfaced to a computer.

It is therefore an object of the present invention is to provide an inexpensive, light-weight and compact scanning apparatus that is compatible with a portable computing device.

A further object of the present invention is to provide a scanning apparatus that can be connected to a standard PCMCIA port.

A still further object of the present invention is to provide a scanning apparatus housed within a standard PCMCIA memory card.

An additional objective of the present invention is to pivotably mount a scanning apparatus on the exterior of a PCMCIA card.

A further objective of the present invention is to provide a scanner apparatus that can be connected to a computer through an existing PCMCIA compatible port.

SUMMARY OF THE INVENTION

In accordance with these and other objects, the present invention is a miniature high speed scanning element integrated within an industry standard PCMCIA card so as to be compatible with portable computers employing the PCMCIA standard. The scanner reads bar code symbols through an aperture in the card housing that is preferably located at the end opposite the PCMCIA connector.

In a preferred embodiment, a scan mirror is mounted on a flexural member upon which a magnet is also mounted. A coil surrounding the magnet is energized with a drive signal, and the magnet and flexural member are caused thereby to oscillate at a resonant frequency, thus causing the mirror to reflect an incident laser beam onto a target bar code symbol.

In an alternative embodiment, the scanner is pivotably mounted on the outside of the PCMCIA card housing and the scan field is adjustable in both the horizontal and vertical directions.

The exteriorly mounted scanner head may be releasably attached to the PCMCIA card housing and electrically connected thereto by means of a semi-automatic retractable electrical cable, thus enabling selective detachment of the scanning head when desired by the user while maintaining electrical connectivity.

In another embodiment, the scanner uses two mirrors to provide an omnidirectional scan pattern. The first mirror oscillates along one axis and the second mirror oscillates along a second axis.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 1:
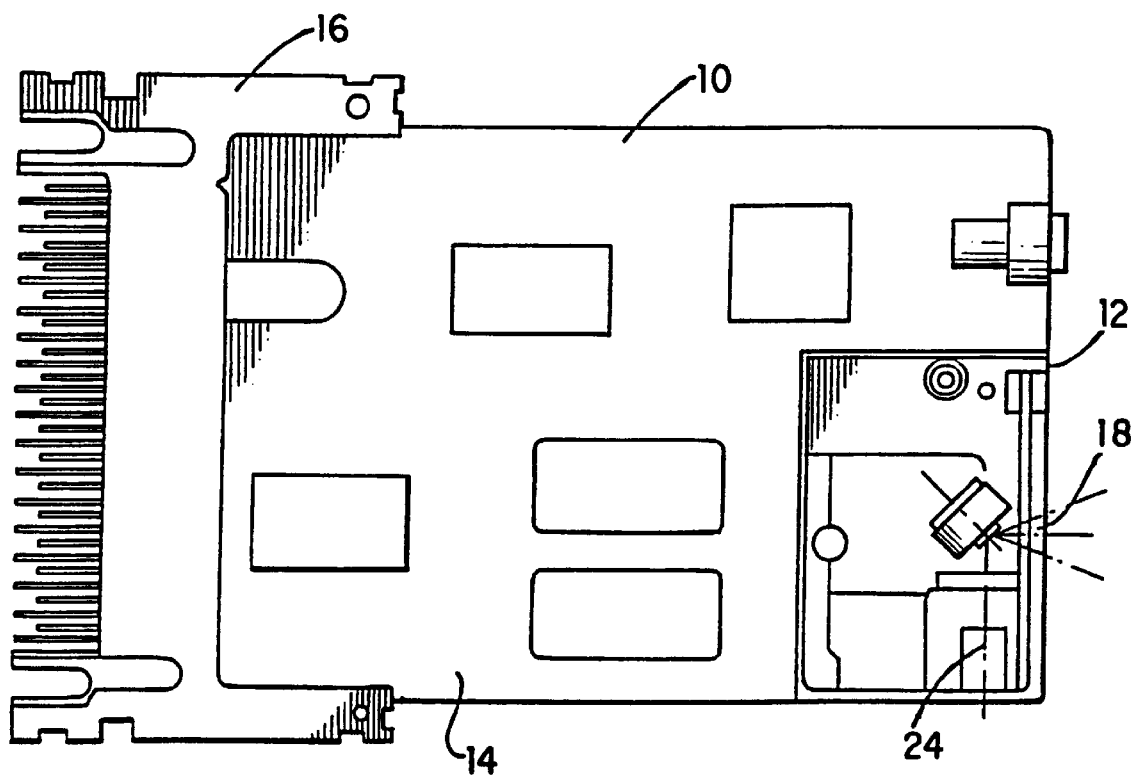
FIG. 1 shows a PCMCIA card with a miniature high speed scan element mounted thereon.

FIG. 1 shows a standard PCMCIA card 10 containing the scanning means and the sensor (the "scanner") 12, and the circuit board 14 for processing the signal generated by the sensor. The circuit board 14 in the PCMCIA card housing 10 and the electronic components contained thereon are selected to be compatible with the scanning means that is used. The details for processing the signal generated by the various scanning means and sensors that are used are well known in the art. The connector end 16 of the card 10 consists of a standard 68-pin PCMCIA connector that is compatible with ports on computers and other electronic devices that comply with PCMCIA standards. The card 10 includes a scanning means 12 located opposite the connector end 12. The light beam generated by the scanner 12 passes through an aperture 18 in the card housing 10 and the light reflected from the target bar code or symbol passes through the same aperture 18 and is detected by the sensor. The aperture 18 is preferably located in the end of the card opposite the connector, although it may also be located in the sides or top or bottom surfaces of the card.

The light beam generated by the scanner 12 is directed though the aperture 18 in the PCMCIA card housing 10, reflects off the bar code and is detected by the sensor. The sensor generates an electrical signal proportional to the intensity of the reflected light. The electrical signal is processed by the electrical components on the circuit board 14 in the PCMCIA card housing 10. The output signal that is sent to the host computer is either an amplified analog signal that is further processed in the host computer or it is a processed digitized signal corresponding to the bar code symbol.

FIG. 1 shows a PCMCIA card 10 with a cantilever mode scanner of the present invention. The sensing means provides a compact bar code scanner which in different embodiments is capable of scanning in any one of several modes, a linear scan mode in which it scans along a single axis, an omnidiectional scan mode in which it scans with consecutive scan lines which are angularly displaced relative to each other in an omnidirectional scan pattern, such as a Lissajous scan pattern, or a raster scan mode in which it scans with consecutive scan lines along a fist scan axis, and the consecutive scan lines are displaced relative to each other along a second perpendicular axis.

Figure 2A:
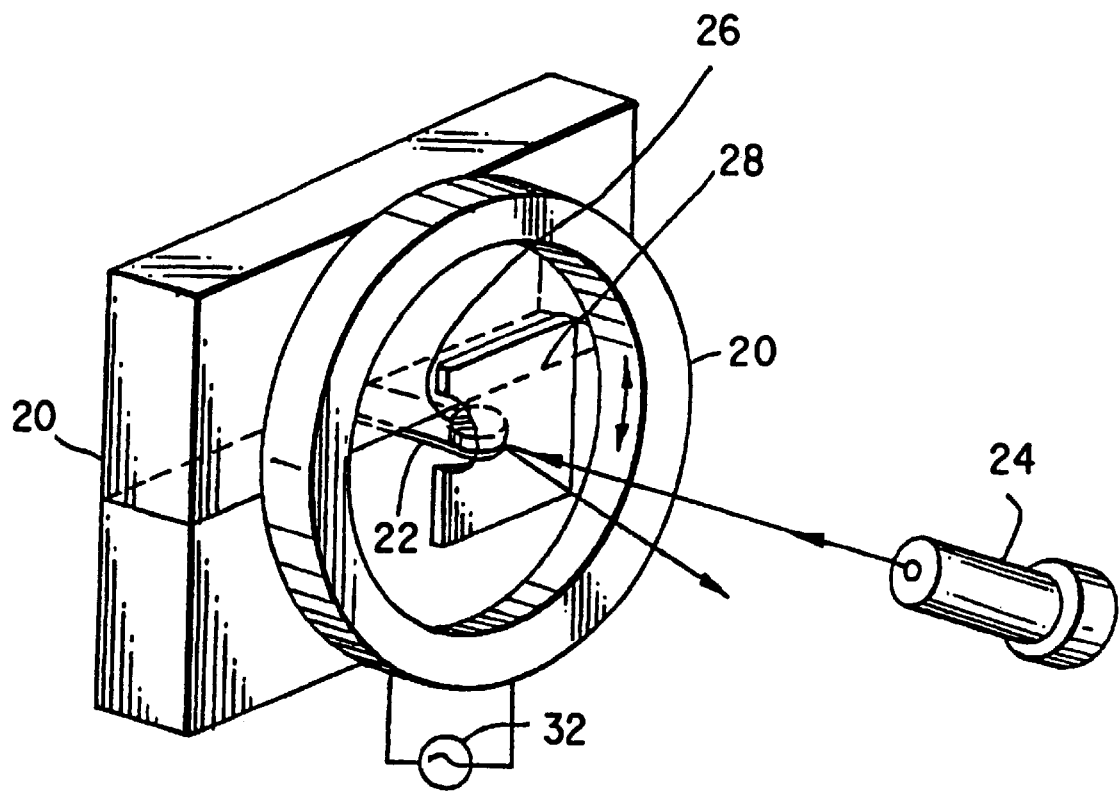
FIG. 2A shows the miniature high speed scanner of the present invention that uses a magnetic field to oscillate the scanning mirror.

FIG. 2A shows a perspective view of the compact bar code scanner 12 of FIG. 1. A flexural member 22 is supported at one end in a cantilever fashion by a base 20, and mounts thereon a permanent magnet 26 and a scanning mirror 28 which has a scanning beam directed thereon, as from a visible laser diode 24. A drive coil 30 is positioned adjacent to the permanent magnet, and during operation a periodically changing drive signal 32 introduced into the coil 30 induces a periodically changing magnetic fields The periodically changing magnetic field causes the flexural member 22, with the permanent magnet 26 and scanning mirror 28 mounted thereon, to oscillate at the frequency of the periodically changing drive signal, thereby causing a linear scanning of the scanning beam. For efficiency of operation, the resonant mechanical frequency of the flexural member 22 with the scanning mirror 28 and permanent magnet 26 mounted thereon is designed to be at or near the frequency of the periodically changing drive signal.

Figure 2B:
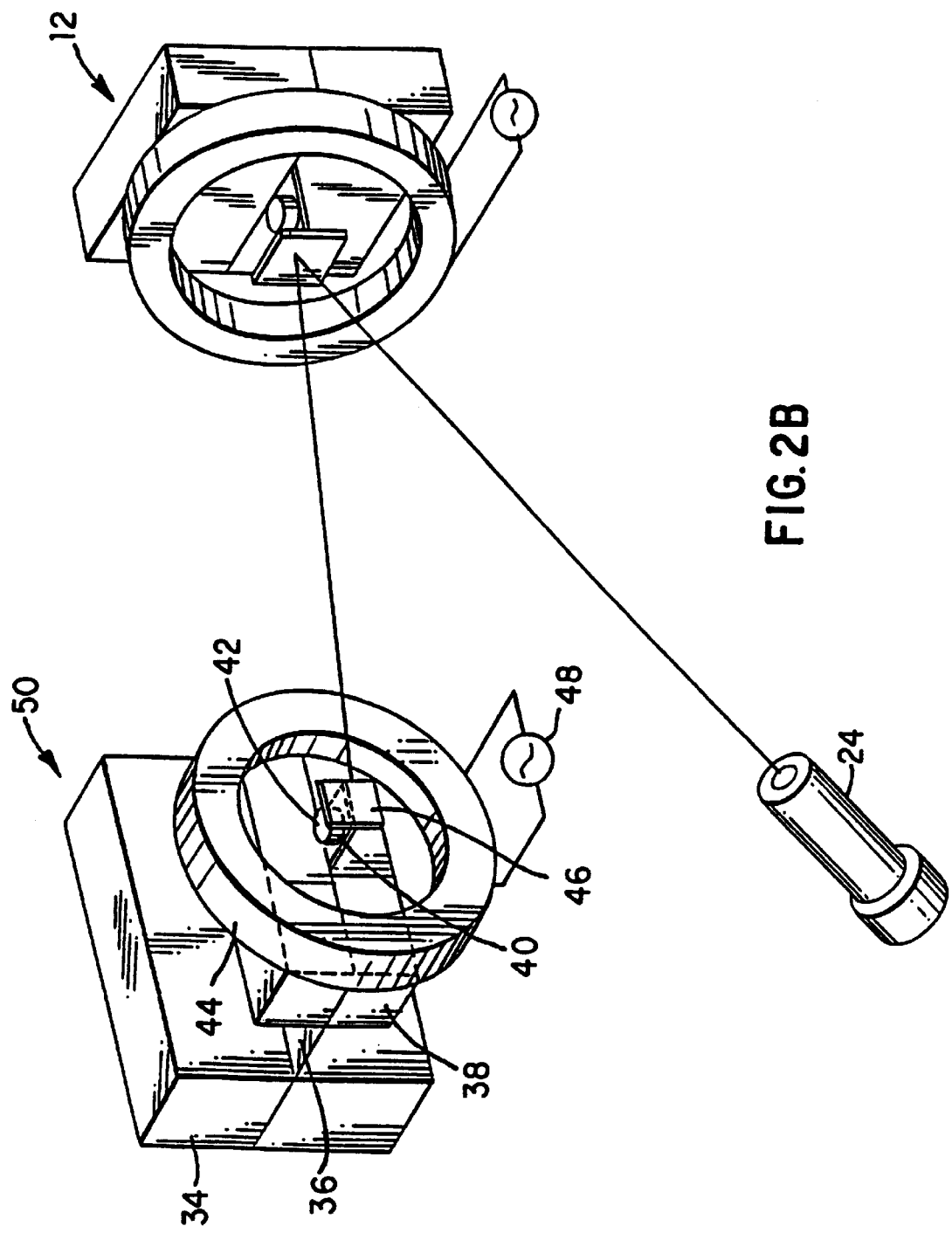
FIG. 2B shows a scanner that uses two scanning mirrors oscillated by magnetic fields for omnidirectional scanning.

FIG. 2B illustrate a universal pattern, compact bar code scanning arrangement which operates partially according to the principle of operation of the scanner of FIG. 2A and which is capable of scanning at a relatively high frequency in an x direction, and of not scanning in a y direction for production of a linear x scan, or of scanning at two different resonant frequencies in a y direction, a relatively high frequency or a relatively low frequency. A variety of bar codes and different bar code reading conditions require different types of scan patterns, such as linear scans, raster scan patterns, or omnidirectional scan patterns such as Lissajous type scan patterns. The embodiment of FIG. 2B is capable of producing all of these scan patterns with a relatively simple construction, and includes a double resonant construction for producing either a high or low frequency y vertical scan motion.

In the universal scanning arrangement of FIG. 2B, a light beam from a suitable source such as a visible Laser Diode (VLD) 24 is directed initially onto a high speed horizontal x deflection arrangement 12 which produces high speed x scanning deflections of the beam. The x deflection arrangement 12 can be and preferably is the scale as the linear scanning arrangement in FIG. 2A. The resultant x scanned beam is then directed to a vertical deflection arrangement 50, which produces either no, or low or high speed vertical scanning deflections of the beam, provided respectively for raster and omnidirectional scan patterns. The y scanning arrangement 50 includes a flexible base provided with two degrees of mechanical freedom to provide two resonant conditions, a low frequency y scan for raster patterns, and a high frequency y scan for omnidirectional patterns. The y scanning arrangement is driven by the electromagnetic forces produced by a coil 44 which encircles a permanent magnet 42 mounted in the y scanning assembly 50 in a manner similar to that as explained with reference to the embodiment of FIG. 2A.

The y scanning assembly 50 comprises a base 34 which supports a cantilever mounted low frequency flexural strip 36 which supports at its free end a mass 38, which in turn supports a smaller cantilever mounted high frequency flexural strip 40. The flexural strip 40 mounts thereon the permanent magnet 42 positioned within the coil 44, and a scanning mirror 46 mounted at the free end of the flexural strip 40. In this arrangement, the mass 38 and all of the structure mounted thereon (40, 42, 46) can oscillate on the cantilever mounted low frequency flexible strip 36 at a low resonant frequency $F_{rl}$, and the magnet 42 and scan mirror 46 can oscillate on the smaller cantilever mounted high frequency flexible strip 40 at a high resonant frequency $f_{rh}$. The mass 38 is selected to tune the resonant frequency of the low frequency y drive signal for efficient operation. Similar to the first embodiment, for efficient operation the resonant mechanical frequency of the high frequency y flexural member with the y scanning mirror and permanent magnet mounted thereon is designed to be at or near the frequency of the periodically changing high frequency y drive signal. The resonant frequency of each vibrating assembly is determined in general by the spring constant K of the vibrating member and the mass M and distribution of mass of the vibrating assembly. In the two degrees of freedom embodiment of FIG. 2B, each of the two vibrating assemblies has a different spring constant K ($K_1$ and $K_2$) and a different mass M ($M_1$ and $M_2$) and distribution of mass.

The scanning arrangement is very compact in size. This allows the arrangement to be mounted in a PCMCIA card or as a scan module mounted pivotably and exteriorly to the PCMCIA card.

Figure 3:
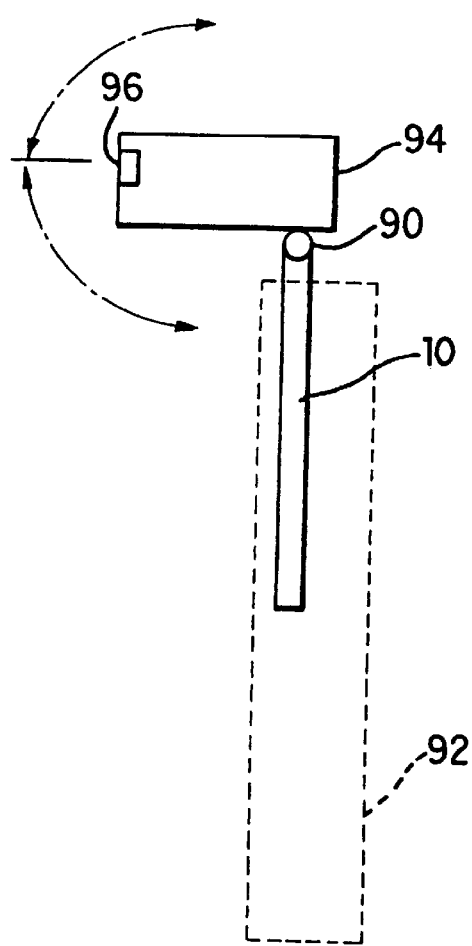
FIG. 3 is a side view of a PCMCIA card with a scan module pivotably mounted on the exterior.
Figure 4:
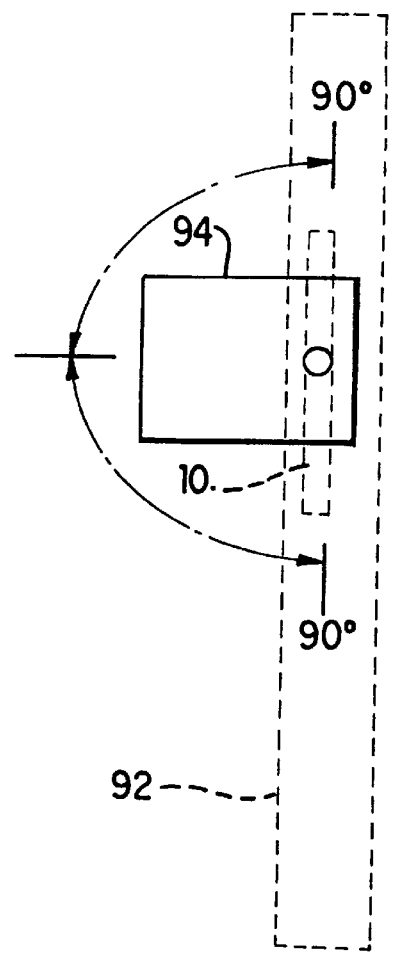
FIG. 4 is a top view of the PCMCIA card of FIG. 3.

FIGS. 3 and 4 show the scanner module 94 mounted exteriorly to the PCMCIA card 10 by an articulated joint 90 that permits the light beam generated by the scanner to be rotated in the vertical direction and in the horizontal direction. The signal generated by the sensor is processed by the electronic components inside the PCMCIA card and then sent to the host computer 92. The scanner module 94 houses a scanner and sensor selected from the scanners and sensors disclosed herein. The light beam generated by the scanner and directed at a bar code symbol passes through an aperture 96 in the scanner module 94 and the light reflected from the bar code passes through the aperture 96 and is measured by the sensor. The scanner controls and the sensor signal decoder can be located On the scanner module 94 or they can be located in the PCMCIA card 10 and connected to the scanner and sensor located in the scanner module 94 by interconnecting wires.

Figure 5:
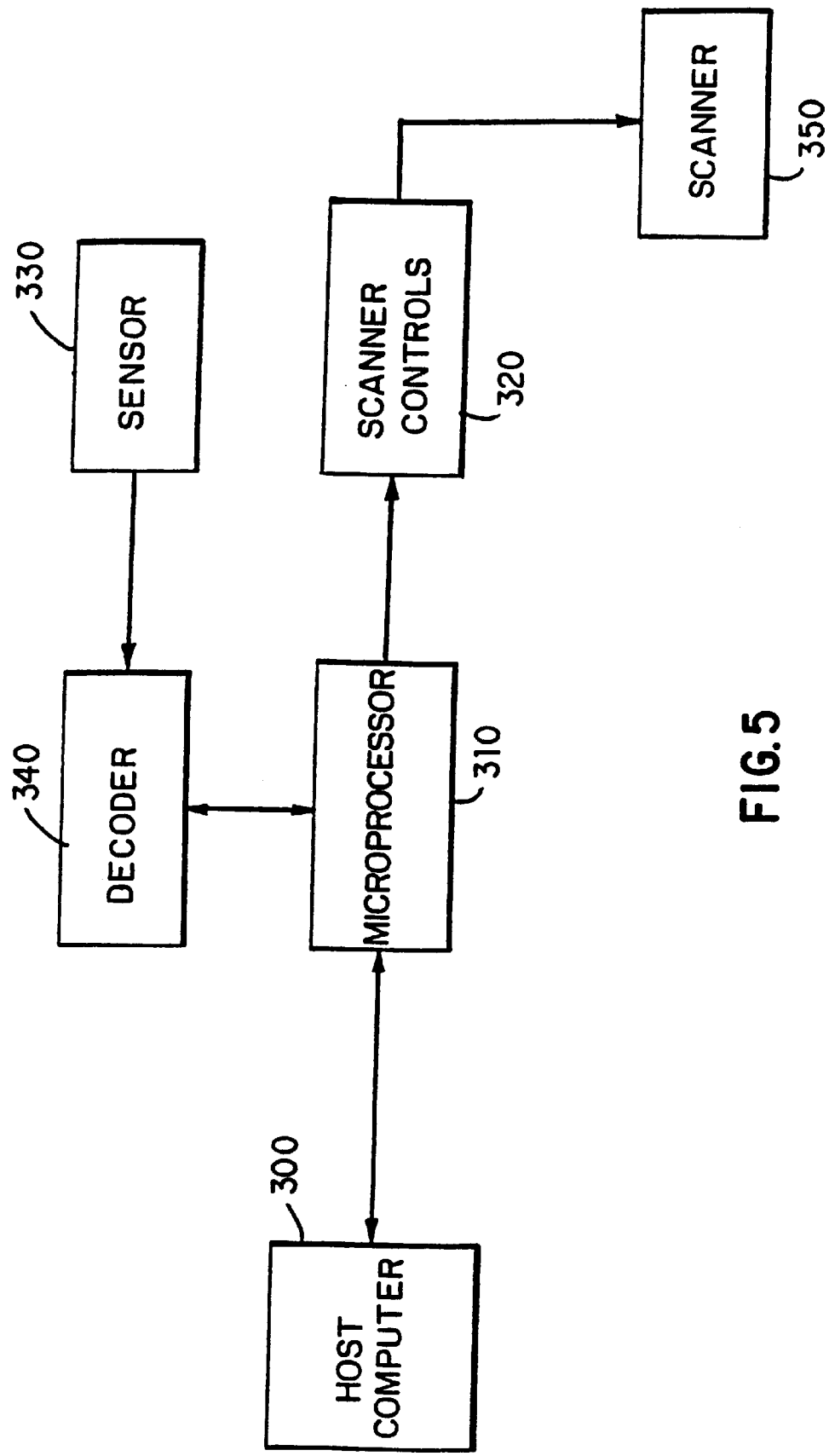
FIG. 5 is a block diagram showing the elements of the present invention.

FIG. 5 shows a block diagram of the present invention. The microprocessor 310, scanner controls 320, the scanner 350, the sensor 330, and the decoder 340 are housed in the PCMCIA card and connected to a host computer 300. In another embodiment, scanner 350 and the sensor 330 are exteriorly mounted to the PCMCIA card.

For any of the embodiments described above, the PCMCIA card can by powered through the host computer or have an integral power source so that an external power supply is not required.

Figure 6:
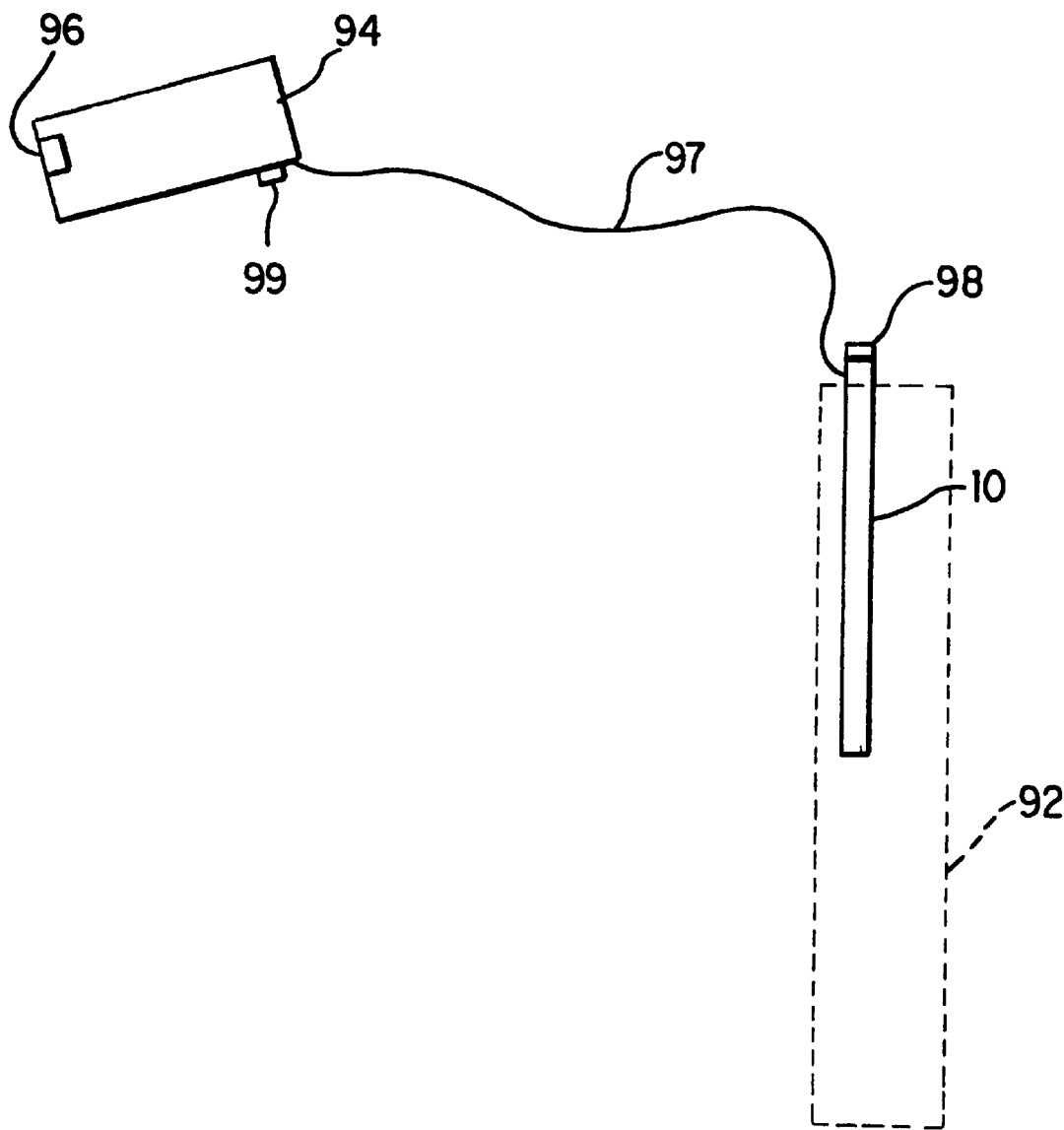
FIG. 6 is a side view of a PCMCIA card with a scan module mechanically detached from the card but remaining in electrical communication

FIG. 6 shows a further embodiment, wherein the scanner module 94 is releasably attached to the PCMCIA card 10 for removal and remote scanning when desired by the user. The scanner module 94 may be releasably attached by any of various means well known in the art allowing quick and easy detachment by the user; such as by hook and loop closures sold under the VELCRO tradename, or by mating guide rails formed in the module 94 and card 10, respectively. Mating portions 98 and 99 are mounted on the scanner module 94 and PCMCIA card 10, respectively, to accomplish such releasable attachment.

Electrical connectivity is achieved in the embodiment of FIG. 6 by means of a retractable cable 97. The cable 97 provides electrical power from the computer 92 to the scanner module 94, as well as control signals sufficient to indicate to the scanner module 94 when to start and stop scanning in accordance with well known techniques in the art. In addition, the digitized and/or decoded signals indicative of the scanned bar code which are obtained from the scanner module 94 are provided to the host computer 92 via the cable 97.

The length of the cable 97 may be appropriate in accordance with the application, and is generally desired to be on the order of five or six feet to allow the user to grasp the computer 92 in one hand and to detach the module 94 with the other for scanning of a bar code.

Figure 7A:
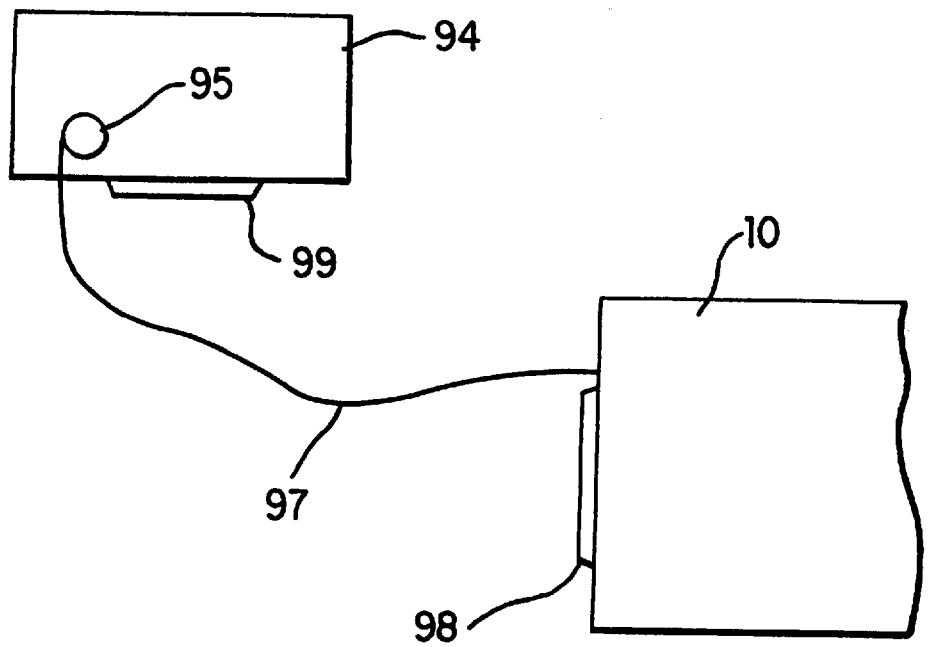
FIGS. 7a and 7b illustrate various locations for the mechanical retraction unit of the present invention.
Figure 7B:
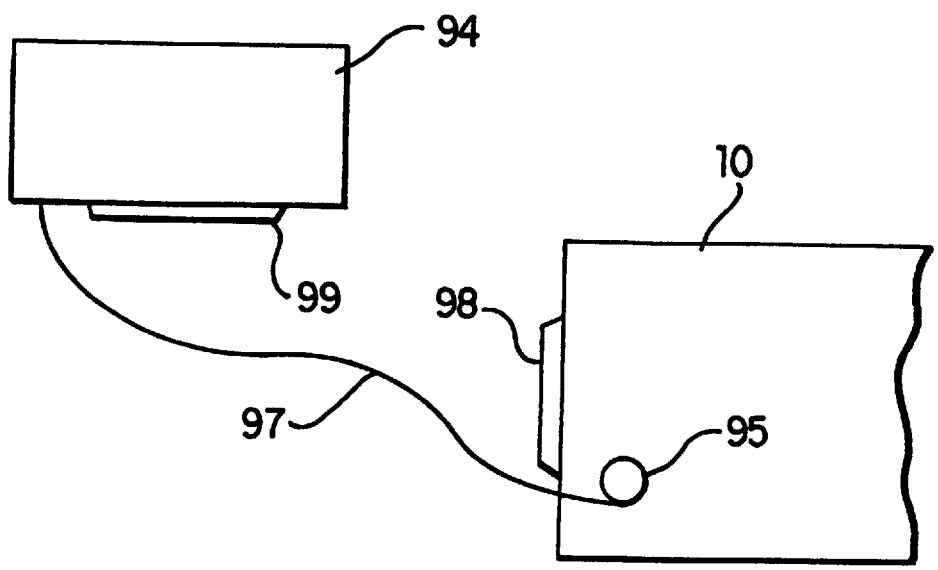

The cable 97 is mechanically released and retracted, if desired,by means of a mechanical retraction unit 95 located in either the scanner module 94 or in the PCMCIA card 10, as shown in FIGS. 7a and 7b. Retraction unit 95 is well known in the art and is shown for example, in U.S. Pat. No. 5,094,396, RETRACTABLE REEL ASSEMBLY FOR TELEPHONE EXTENSION CORD, which is incorporated by reference herein.

If desired, the retraction unit 95 may be omitted and an otherwise ergonomically advantageous cord may be used; coiled, elastic, etc.

In addition to the laser scanner embodiments described herein, the present invention also contemplates the use of a CCD type bar code reader unit be encased within the scanner module 94. Such CCD bar code sensors are well known in the art and can be used in lieu of laser scanners where desired by the particular application.

While the invention has been illustrated and described as embodied in a bar code scanner housed in a PCMCIA card, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A scanning device for reading bar code symbols comprising:
   a) a housing;
   b) a PCMCIA card integrated as part of said housing,
   b) a light source disposed in said housing for generating a light beam; and
   c) a sensor disposed in said housing for detecting the intensity of reflected light from said light beam and generating an electrical signal proportional to the intensity of said reflected light; wherein said light source and sensor are operably connected to said PCMCIA card.

2. The scanning device of claim 1, further comprising a signal processor for receiving said electrical signal and producing a digitized signal corresponding to the bar code symbol.

3. The scanning device of claim 2, wherein said signal processor is located exteriorly to said PCMCIA card.

4. The scanning device of claim 2, wherein said signal processor is located on said PCMCIA card.

5. The scanning device of claim 1, wherein said PCMCIA card further comprises a PC interface for communication with a host computer.

6. The device of claim 1, further comprising an optical component for modifying said light beam.

7. The scanning device of claim 2, further comprising a control circuit for de-energizing said light after said signal processing means has produced a digitized signal corresponding to a valid bar code symbol.

8. The scanning device of claim 1, further comprising
   a) a signal processor for receiving said electrical signal and producing a digitized signal corresponding to the bar code symbol; and
   b) a control circuit for de-energizing said light after said signal processor has produced a digitized signal corresponding to a valid bar code symbol; and
   c) a PC interface for communicating with a host computer.

9. The scanning device of claim 1, further comprising a display for displaying information to a user.

10. The scanning device of claim 1, further comprising an input port for accepting user input.

11. The scanning device of claim 10, wherein said input port comprises a plurality of actuation keys.

12. The scanning device of claim 1, further comprises a touchscreen.

13. The scanning device of claim 1, further comprising
   a) an input port for accepting a user input; and
   b) a display for displaying information to a user; wherein said user input gets displayed on said display.

14. A portable hand-held terminal comprising:
   a) a housing;
   b) display disposed in said housing for displaying information to a user on a top surface of said housing;
   c) a plurality of actuation keys disposed in said housing for entering information into the terminal, whereby a majority of said keys is disposed on the top surface of said housing;
   d) a reader for reading encoded information including an illumination source and a sensor, said reader having a field of view projected from an edge surface of said housing; and
   e) a processing unit for processing a set of information entered into the terminal via said actuation keys and via said reader.

15. The hand-held terminal of claim 14, wherein said sensor is a CCD sensor.

16. The hand-held terminal of claim 14, further comprising a power supply.

17. The hand-held terminal of claim 16, wherein said power supply is a rechargeable battery.

18. The hand-held terminal of claim 14, further comprising a PC interface.

19. A scanning device for reading bar code symbols comprising:
   a) a housing;
   b) a miniaturized interface card integrated as part of said housing;
   b) a light source disposed in said housing or generating a light beam; and
   c) a sensor disposed in said housing for detecting the intensity of reflected light from said light beam and generating an electrical signal proportional to the intensity of said reflected light; wherein said light source and sensor are operably connected to said miniaturized interface card.

20. The scanning device of claim 19, further comprising a signal processor for receiving said electrical signal and producing a digitized signal corresponding to the bar code symbol.

21. The scanning device of claim 20, wherein said signal processor is located exteriorly to said miniaturized interface card.

22. The scanning device of claim 20, wherein said signal processor is located on said miniaturized interface card.

23. The scanning device of claim 19, wherein said miniaturized interface card further comprises a PC interface for communication with a host computer.

24. The device of claim 19, further comprising an optical component for modifying said light beam.

25. The scanning device of claim 20, further comprising a control circuit for de-energizing said light after said signal processing means has produced a digitized signal corresponding to a valid bar code symbol.

26. The scanning device of claim 19, further comprising
   a) a signal processor for receiving said electrical signal and producing a digitized signal corresponding to the bar code symbol; and b) a control circuit for de-energizing said light after said signal processor has produced a digitized signal corresponding to a valid bar code symbol; and c) a PC interface for communicating with a host computer.

27. The scanning device of claim 19, further comprising a display for displaying information to a user.

28. The scanning device of claim 19, further comprising an input port for accepting user input.

29. The scanning device of claim 28, wherein said input port comprises a plurality of actuation keys.

30. The scanning device of claim 19, further comprises a touchscreen.

31. The scanning device of claim 19, further comprising a) an input port for accepting a user input; and b) a display for displaying information to a user; wherein said user input gets displayed on said display.

32. A portable hand-held terminal comprising:

a) a housing;

b) display disposed in said housing for displaying information to a user on a top surface of said housing;

c) a plurality of actuation keys disposed in said housing for entering information into the terminal, whereby a majority of said keys is disposed on the top surface of said housing;

d) a reader for reading encoded information including an illumination source and a sensor, said reader having a field of view projected from an edge surface of said housing; and e) a processing unit for processing a set of information entered into the terminal via said actuation keys and via said reader; wherein said reader is disposed on a miniaturized interface card.

33. The hand-held terminal of claim 32, wherein said sensor is a CCD sensor.

34. The hand-held terminal of claim 32, further comprising a power supply.

35. The hand-held terminal of claim 34, wherein said power supply is a rechargeable battery.

36. The hand-held terminal of claim 32, further comprising a PC interface.

37. A scanning device for reading bar code symbol, comprising:

a) a light source for generating a light beam;

b) a sensor for detecting the intensity of reflected light from said light beam and generating an electrical signal proportional to the intensity of said reflected light; and c) signal processing means in said device to receive said electrical signal and to produce a digitaized signal corresponding to the bar code symbol; wherein said scanning device is housed in a miniaturized interface card.

38. A scanning device according to claim 37 including a scanner in said device for scanning said light beam along a scan line across the bar code symbol, said scanner including a scan element.

39. A scanning device according to claim 37 including an optical means for directing and focusing said beam of light.

40. A scanning device according to claim 37 including a control circuit for de-energizing said light source after said signal processing means has produced a digitized signal corresponding to a valid bar code symbol.

41. A scanning device according to claim 39 wherein said optical means is a mirror.

42. A scanning device according to claim 37 wherein the light source is a laser diode.

43. A scanning device according to claim 37 wherein the light source is a charged-coupled device.

44. A scanning device according to claim 39 wherein said optical means and a permanent magnet are mounted in a cantilevered fashion on a flexural member supported by a base and positioned adjacent to a drive coil; wherein a periodic drive signal introduced into the drive coil induces a periodically changing magnetic field to oscillate said optical means.

45. A scanning device according to claim 44 wherein said optical means is a mirror.

46. A scanning device according to claim 44 wherein a second optical means and a second permanent magnet are mounted in a similar fashion to said first optical means and have a second drive coil and a second periodic drive signal wherein the first and second periodic drive signals independently introduced to the first and second drive coils induce periodically changing magnetic fields to oscillate said optical means.

47. A scanning device for reading bar code symbols, comprising:

(a) a light source for generating a light beam;

(b) a sensor for detecting the intensity of reflected light from said light beam and generating an electrical signal proportional to the intensity of said reflected light; and (c) signal processing means in said device to receive said electrical signal and to produce a digitized signal corresponding to the bar code symbol; wherein said signal processing means is housed in a miniaturized interface card.

48. A scanning device according to claim 47 including a scanner in said device for scanning said light beam along a scan line across the bar code symbol, said scanner including a scan element.

49. A scanning device according to claim 47 including an optical means for directing and focusing said beam of light.

50. A scanning device according to claim 47 including a control circuit for de-energizing said light source after said signal processing means has produced a digitized signal corresponding to a valid bar code symbol.

51. A scanning device according to claim 49 wherein said optical means is a mirror.

52. A scanning device according to claim 47 wherein the light source is a laser diode.

53. A scanning device according to claim 47 wherein the sensor is a charged-coupled device.

54. A scanning device according to claim 49 wherein said optical means and a permanent magnet are mounted in a cantilevered fashion on a flexural member supported by a base and positioned adjacent to a drive coil; wherein a periodic drive signal introduced into the drive coil induces a periodically changing magnetic field to oscillate said optical means.

55. A scanning device according to claim 54 wherein said optical means is a mirror.

56. A scanning device according to claim 54 wherein a second optical means and a second permanent magnet are mounted in a similar fashion to said first optical means and have a second drive coil and a second periodic drive signal; wherein the first and second periodic drive signals independently introduced to the first and second drive coils induce periodically changing magnetic fields to oscillate said optical means.

* * * * *

UNITED STATES PATENT AND TRADEMARK OFFICE
CERTIFICATE OF CORRECTION

PATENT NO.    : 6,036,098
DATED         : March 14, 2000
INVENTOR(S)   : Ron Goldman et al.

It is certified that error appears in the above-identified patent and that said Letters Patent is hereby corrected as shown below:

Column 7,
Line 31, "b)" should be -- c) --.
Line 33, "c)" should be -- d) --.

Column 8,
Line 38, "b)" should be -- c) --.
Line 38, "or" should be -- for --.
Line 40, "c)" should be -- d) --.

Column 9,
Line 43, "symbol" should be -- symbols --.

Signed and Sealed this

Sixth Day of May, 2003

JAMES E. ROGAN
*Director of the United States Patent and Trademark Office*